(12) United States Patent
Al-Ansari et al.

(10) Patent No.: US 12,446,984 B2
(45) Date of Patent: Oct. 21, 2025

(54) SYSTEM FOR PERFORMING MR-GUIDED TRANSRECTAL PROSTATE BIOPSY

(71) Applicants: Qatar Foundation for Education, Science and Community Development, Doha (QA); HAMAD MEDICAL CORPORATION, Doha (QA)

(72) Inventors: Abdulla Al-Ansari, Doha (QA); Adham Darweesh, Doha (QA); Khalid Al-Rumaihi, Doha (QA); Carlos Velasquez, Doha (QA); Julien Abinahed, Doha (QA); Nikhil Navkar, Doha (QA); Mansour Karkoub, Doha (QA); Nikolaos Tsekos, Doha (QA)

(73) Assignees: QATAR FOUNDATION FOR EDUCATION, SCIENCE AND COMMUNITY DEVELOPMENT, Doha (QA); HAMAD MEDICAL CORPORATION, Doha (QA)

( * ) Notice: Subject to any disclaimer, the term of this patent is extended or adjusted under 35 U.S.C. 154(b) by 981 days.

(21) Appl. No.: 17/619,170

(22) PCT Filed: Jun. 14, 2020

(86) PCT No.: PCT/QA2020/050008
§ 371 (c)(1),
(2) Date: Dec. 14, 2021

(87) PCT Pub. No.: WO2020/251382
PCT Pub. Date: Dec. 17, 2020

(65) Prior Publication Data
US 2022/0304757 A1    Sep. 29, 2022

Related U.S. Application Data

(60) Provisional application No. 62/861,438, filed on Jun. 14, 2019.

(51) Int. Cl.
*A61B 34/00* (2016.01)
*A61B 10/02* (2006.01)
(Continued)

(52) U.S. Cl.
CPC .......... *A61B 34/71* (2016.02); *A61B 10/0241* (2013.01); *A61B 34/10* (2016.02);
(Continued)

(58) Field of Classification Search
CPC .... A61B 10/0241; A61B 34/71; G01R 33/286
See application file for complete search history.

(56) References Cited

U.S. PATENT DOCUMENTS 5,398,691 A * 3/1995 Martin ................. A61B 8/4466
600/463
5,810,007 A    9/1998 Holupka
(Continued)

FOREIGN PATENT DOCUMENTS

EP    2034921 A1    3/2009

OTHER PUBLICATIONS

International Search Report for related International Application No. PCT/QA2020/050008; report dated Jan. 22, 2021; (2 pages).
(Continued)

*Primary Examiner* — Erin McGrath
(74) *Attorney, Agent, or Firm* — K&L Gates LLP

(57) ABSTRACT

A transrectal probe manipulator system includes a probe comprising a biopsy needle and a manipulator. The manipulator includes a base including first and second base support shafts on a base body, a main frame, and a mounting plate. A lower end of the main frame is rotatably connected to the base through a first shaft to define a first degree of freedom. The mounting plate includes first and second mounting plate support shafts and a probe receiver, and is rotatably connected to the main frame through a second shaft to define a
(Continued)

second degree of freedom. The probe receiver is rotatable about a central axis to define a third degree of freedom, and linearly moveable along the central axis to define a fourth degree of freedom. The probe is secured to the probe receiver. The manipulator is driven by cables which are attached to the shafts in an actuation assembly.

16 Claims, 10 Drawing Sheets

(51) Int. Cl.
    *A61B 34/10*     (2016.01)
    *A61B 34/20*     (2016.01)
    *A61B 34/30*     (2016.01)
    *G01R 33/28*     (2006.01)

(52) U.S. Cl.
    CPC ...... *G01R 33/286* (2013.01); *A61B 2034/102* (2016.02); *A61B 2034/107* (2016.02); *A61B 2034/2051* (2016.02); *A61B 2034/2063* (2016.02); *A61B 2034/303* (2016.02)

(56) References Cited

U.S. PATENT DOCUMENTS

| | | | |
|---|---|---|---|
| 5,820,623 | A | 10/1998 | Ng |
| 6,665,554 | B1* | 12/2003 | Charles ................. A61B 90/11 |
| | | | 606/130 |
| 9,588,195 | B2 | 3/2017 | Fichtinger et al. |
| 2002/0087049 | A1* | 7/2002 | Brock .................... A61B 90/36 |
| | | | 600/114 |
| 2002/0156376 | A1 | 10/2002 | Wang |
| 2004/0024385 | A1* | 2/2004 | Stuart ................... B25J 9/1065 |
| | | | 606/1 |
| 2004/0092810 | A1 | 5/2004 | Daum |
| 2008/0249403 | A1 | 10/2008 | Suri |
| 2008/0287827 | A1 | 11/2008 | Sarkar |
| 2015/0366546 | A1 | 12/2015 | Kamen et al. |
| 2017/0202537 | A1 | 7/2017 | Ippolito et al. |
| 2019/0223962 | A1* | 7/2019 | Roldan ................. A61B 34/30 |

OTHER PUBLICATIONS

Written Opinion for related International Application No. PCT/QA2020/050008; report dated Jan. 22, 2021; (4 bages).

\* cited by examiner

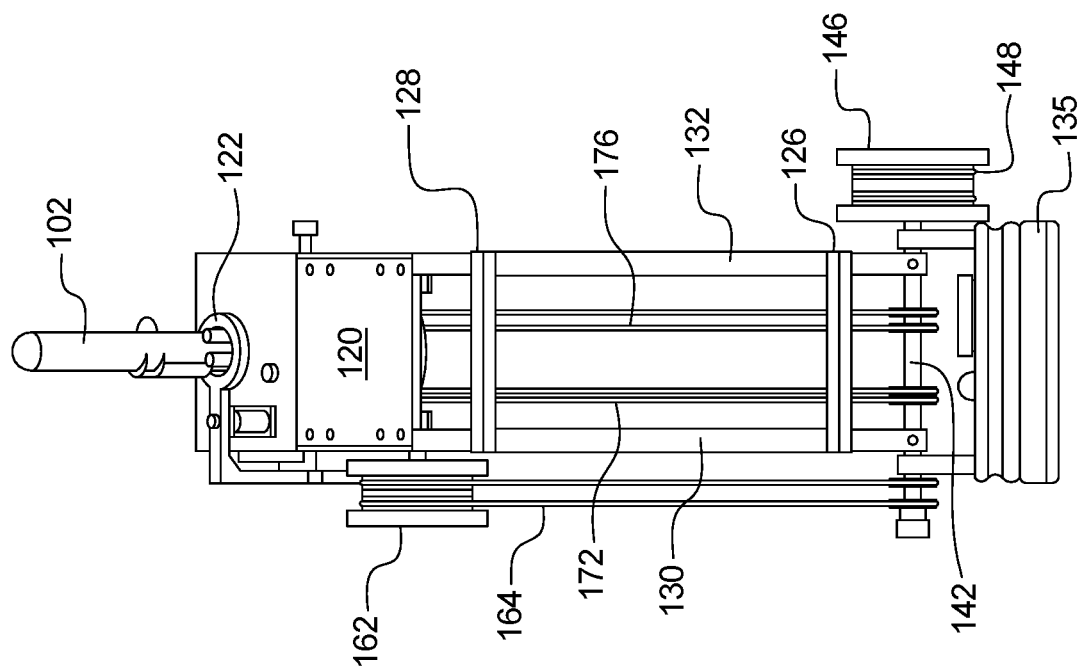
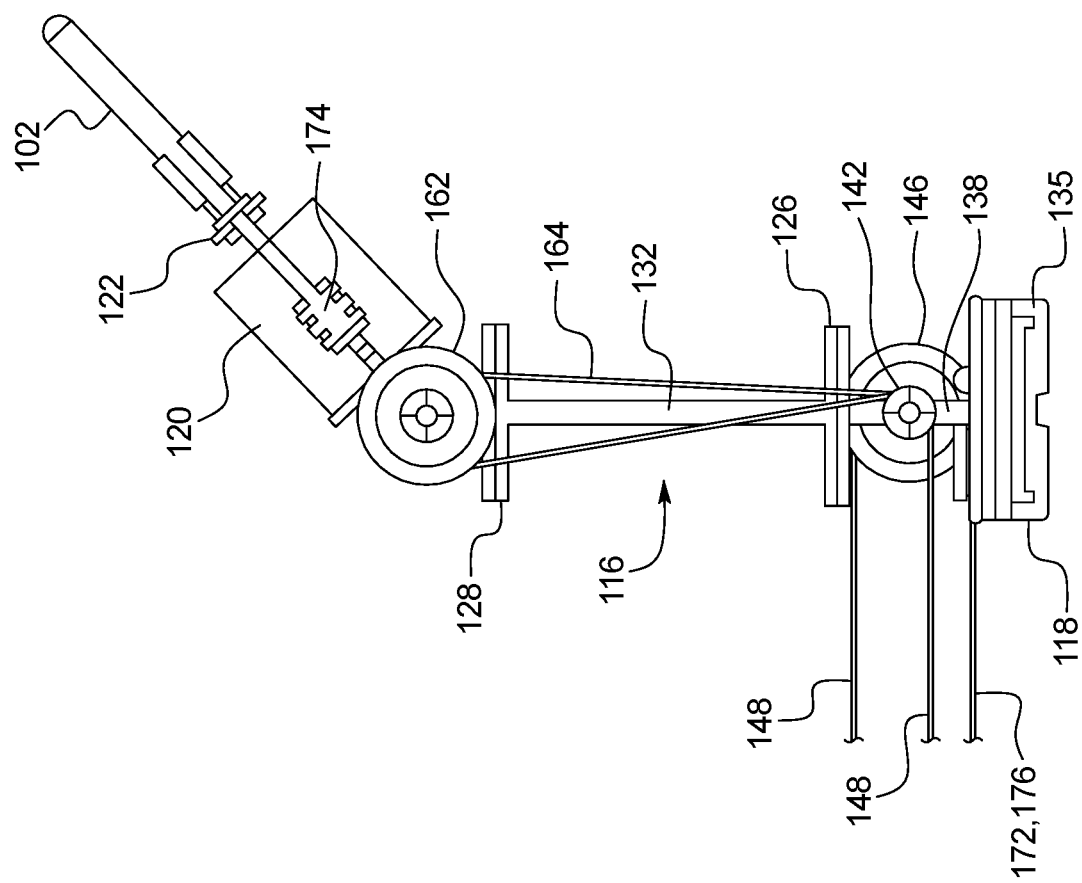

SYSTEM FOR PERFORMING MR-GUIDED TRANSRECTAL PROSTATE BIOPSY

CROSS-REFERENCE TO RELATED APPLICATIONS

This application is a National Stage filing under 35 U.S.C. 371 of International Application No. PCT/QA2020/050008, filed on Jun. 14, 2020, which claims the benefit of priority to U.S. Provisional Patent Application No. 62/861,438, filed Jun. 14, 2019, which is hereby incorporated by reference in its entirety for all purposes.

BACKGROUND

Prostate cancer represents a serious health risk, and an ever-increasing need for detection of the disease necessitates a system that can be used in multiple clinical settings under a variety of circumstances. Currently, the leading and preferred technique among urologists in the detection of prostate cancer is magnetic resonance ("MR")-guided prostate biopsy. These systems operate by taking image slices of a patient and allowing a medical professional to accurately position a probe within the patient to extract a tissue sample. At the moment, existing MR-guided prostate biopsy systems are tailored to be used only in one specific clinical setting, such as a setting that makes use of a magnetic compatible intervention system or another system implementing an MRI-ultrasound fusion system. Depending on the clinical setting, current prostate biopsy systems require specific hardware that functions in only that specific clinical setting, and cannot be customized at a later stage to adapt to a new setting.

Typically, MR-guided transrectal prostate biopsy (MRgPBx) is performed either using an MR-compatible intervention system placed inside the MRI gantry or by using an MRI-ultrasound (MM-US) fusion system. The former makes use of interoperative MM, whereas the latter fuses preoperative MR images with intraoperative ultrasound for guidance. In both systems, a probe with a needle compartment is positioned inside the patient's rectum to target the lesion under image guidance, and then a biopsy needle is used to take tissue samples. Such a procedure is aided by the use of compatible robotic systems.

In prior art solutions, the robotic systems typically only function in one clinical setting and not another. For example, a robotic system may function within an MRI-US fusion system, but may not be compatible when deployed within an MR-compatible intervention system. On other hand, MR-compatible intervention systems require bulky actuation mechanism to be used inside MRI-US fusion system. Due to the limited settings in which current systems function, hospitals or other entities may suffer when a clinical setting changes due to unforeseen circumstances, or when a process or clinical workflow is changed.

A summary of available transrectal MRgPBx systems is provided below in Table 1. The choice of a transrectal MRgPBx system to be incorporated into a hospital for prostate cancer diagnosis depends on several factors, such as logistics associated with the availability of an MR scanner, the type of actuation mechanism (piezoelectric or pneumatic) preferred in the MR scanner room, and costs associated with the clinical workflow and corresponding staff. As a result, nearly all transrectal MRgPBx systems are tailored to be used only in a specific clinical setting and cannot be customized at a later stage to adapt to a new setting.

TABLE 1

Transrectal MRgPBx Systems

| Transrectal MRgPBx Systems | Intervention | Probe Motion |
|---|---|---|
| DynaTRIM - Invivo/Philips | MR-Scanner Room | Manual |
| bkFusion - BK Medical | MRI-US Fusion System | Manual |
| UroNav - Invivo/Philips | MRI-US Fusion System | Manual |
| Trinity ® - KOELIS | MRI-US Fusion System | Manual |
| RCM System - Soteria Medical | MR-Scanner Room | Pneumatic Driven |
| Johns Hopkins University, USA | MR-Scanner Room | Piezo-ceramic-motor |
| Johns Hopkins University, USA | MR-Scanner Room | Flexible shafts |
| Johns Hopkins University, USA | MR-Scanner Room | Piezo-ceramic-motor |
| Radboud University, Netherlands | MR-Scanner Room | Pneumatic Driven |
| Siemens | MRI-US Fusion System | Servo Motors |
| ArtemisTM - Eigen | MRI-US Fusion System | Stepper Motors |
| Steppers - DK Technologies | MRI-US Fusion System | Stepper Motors |

Accordingly, there is a need for a modular system for MR-guided prostate biopsy that is compatible with many different clinical settings and allows for future customization, as described herein.

SUMMARY

To meet the needs described above and others, the present disclosure provides modular systems and methods for performing MR-guided transrectal prostate biopsy (MRgPBx) that allows for customization depending upon the clinical needs of the hospital. The transrectal probe manipulator system of the present application can function in multiple clinical settings, such as those described above. The transrectal probe manipulator system may use either an MR-compatible intervention system placed inside of the MRI gantry or by using an MM-ultrasound fusion system.

In one embodiment of the present disclosure, the transrectal probe manipulator system includes a detachable probe with a biopsy needle compartment mounted on a manipulator. The system may include an actuator assembly to drive a cable system to control the manipulator. A medical professional or operator operates the transrectal probe manipulator system through intervention planning software on an intervention planning workstation, which works in conjunction with MR scanner imaging software on a medical detection scanner workstation to properly position the probe and capture images.

The manipulator includes a main frame rotationally secured to a base and a mounting plate rotationally secured to the main frame, providing the first and second degrees of rotational freedom. The detachable probe mounted onto the mounting plate rotates about a longitudinal axis and allows for linear movement along the longitudinal axis, providing the third and fourth degrees of rotational freedom. Each degree of freedom may be actuated by a cable driven mechanism which may be powered manually or by an actuation assembly.

The transrectal probe manipulator system is used with intervention planning software to actuate the manipulator and fine tune the position of the probe inside the patient's rectum. An operator assesses the trajectory of the biopsy needle in the probe using the intervention planning software, and when the trajectory is properly positioned, the operator may actuate the manipulator which moves the probe into position. More specifically, the medical professional utilizes an MR scanner to capture image slices through the medical detection scanner workstation. The medical detection scanner workstation provides these image slices to the intervention planning software, which enables the operator to visualize the trajectory of the biopsy needle. Then, through the use of the intervention planning workstation to control the actuating assembly and manipulator, the operator actuates the manipulator to fine tune the position of the probe inside the patient's rectum based on the image slices and current position of the probe. Once the probe has been positioned properly, the biopsy needle can be inserted into the probe which will then take a tissue sample based on the probe's location.

In one embodiment, the transrectal probe manipulator system of the present application includes a probe including a biopsy needle and a manipulator. The manipulator includes a base including first and second base support shafts on a base body, a main frame, and a mounting plate. A lower end of the main frame is rotatably connected to the base through a first shaft that extends through the lower end of the main frame and the first and second base support shafts to define a first degree of freedom. The mounting plate includes first and second mounting plate support shafts on a lower surface and a probe receiver on an upper surface. The mounting plate is rotatably connected to the main frame through a second shaft that extends through an upper end of the main frame and the first and second mounting plate support shafts to define a second degree of freedom. The probe receiver is rotatable about and linearly moveable along a central axis to define a third degree of freedom and a fourth degree of freedom, respectively. The probe is secured to the probe receiver.

In other embodiments, the main frame includes first and second support bars. The first shaft extends through the first and second support bars and the first and second base support shafts, and the second shaft extends through the first and second support bars and the first and second mounting plate support shafts.

In another embodiment, the transrectal probe manipulator system further includes a first cable that is operatively connected to the first shaft for actuating the first degree of freedom and a second cable that is operatively connected to the second shaft for actuating the second degree of freedom. In still further embodiments, the transrectal probe manipulator system further includes third and fourth cables that are operatively connected to the probe receiver for actuating the third and fourth degrees of freedom, respectively. In further embodiments, the transrectal probe manipulator also includes an actuation assembly for operating the first, second, third, and fourth cables.

In another embodiment of the present invention, the transrectal probe manipulator of also includes an intervention planning workstation comprising a processor and a memory coupled to the processor, wherein the memory is configured to store program instructions executable by the processor. In response to executing the program instructions, the processor is configured to (1) receive, by an image retrieval module, one or more images of the probe and the base of the manipulator from an MR scanner, (2) receive, by a registration module, the one or more images of fiducial markers attached to the probe and the base of the manipulator from the image retrieval module, (3) register, by the registration module, a virtual model of the base and a virtual model of the probe with respect to the images, and (4) present, by a visualization module, a visualization of the virtual model, wherein the visualization includes a probe position, a trajectory of the biopsy needle, and a target area.

In another embodiment, a transrectal probe manipulator system includes a manipulator and a probe including a longitudinal axis and a biopsy needle. The manipulator includes a base including first and second base support shafts, a main frame including first and second support bars, and a mounting plate including first and second mounting plate support shafts and a movable probe receiver. The manipulator further includes a first shaft having a first axis extending through the first and second base support shafts of the base and the first and second support bars of the main frame and a second shaft having a second axis extending through the first and second mounting plate support shafts of the mounting plate and the first and second support bars of the main frame. The probe is mounted onto the probe receiver. Rotation of the main frame about the first axis provides a first degree of freedom, and rotation of the mounting plate about the second axis provides a second degree of freedom. Rotation of the probe about and linearly movement along the longitudinal axis of the probe provides a third degree of freedom and a fourth degree of freedom, respectively.

In another embodiment, the transrectal probe manipulator system further includes a first pulley on the first shaft, a first cable operatively connected to the first pulley, a second pulley on the second shaft, and a second cable operatively connected to the second pulley. Movement of the first and second cables actuate the first and second degrees of freedom, respectively.

In additional embodiments, the transrectal probe manipulator system also includes a cable drive mechanism for operating the first, second, third, and fourth degrees of freedom, an actuation assembly for operating the cable drive mechanism, and an intervention planning workstation. The intervention planning workstation includes a processor and a memory coupled to the processor, wherein the memory is configured to store program instructions executable by the processor. In response to executing the program instructions, the processor is configured to (1) receive user input to activate the actuation assembly, (2) receive images from an MR scanner, and (3) present a visualization of the virtual model, wherein the visualization includes a probe position, a trajectory of the biopsy needle, and a target area.

In an addition embodiment, the actuation assembly comprises a plurality of motors and corresponding motor controllers for operating the cable drive mechanism. In further embodiments, the actuation assembly comprises a plurality of shafts configured to be rotated manually, and the first, second, third, and fourth cables are connected to the plurality of shafts. In still further embodiments, the actuation assembly comprises a plurality of shafts and a plurality of pneumatic motors for operating the plurality of shafts, and the first, second, third, and fourth cables are connected to the plurality of shafts. In still further embodiments, the processor of the intervention planning workstation is in communication with the plurality of motor controllers.

An object of the invention is to provide a solution for performing a prostate biopsy under both MM-ultrasound fusion systems as well as a MR scanner room.

Another object of the invention is to provide a manipulator with additional degrees of freedom to increase the mobility of the probe positioned within the rectum and increase the accuracy of targeting of the prostate tissue.

Additional objects, advantages, and novel features of the examples will be set forth in part in the description which follows, and in part will become apparent to those skilled in the art upon examination of the following description and accompanying drawings or may be learned by production or operation of the examples. The objects and advantages of the concepts may be realized and attained by means of the methodologies, instrumentalities, and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 5 is a left side elevational view of the transrectal probe manipulator system of FIG. 1.

FIG. 6 is a rear elevational view of the transrectal probe manipulator system of FIG. 1.

DETAILED DESCRIPTION

Figure 1:
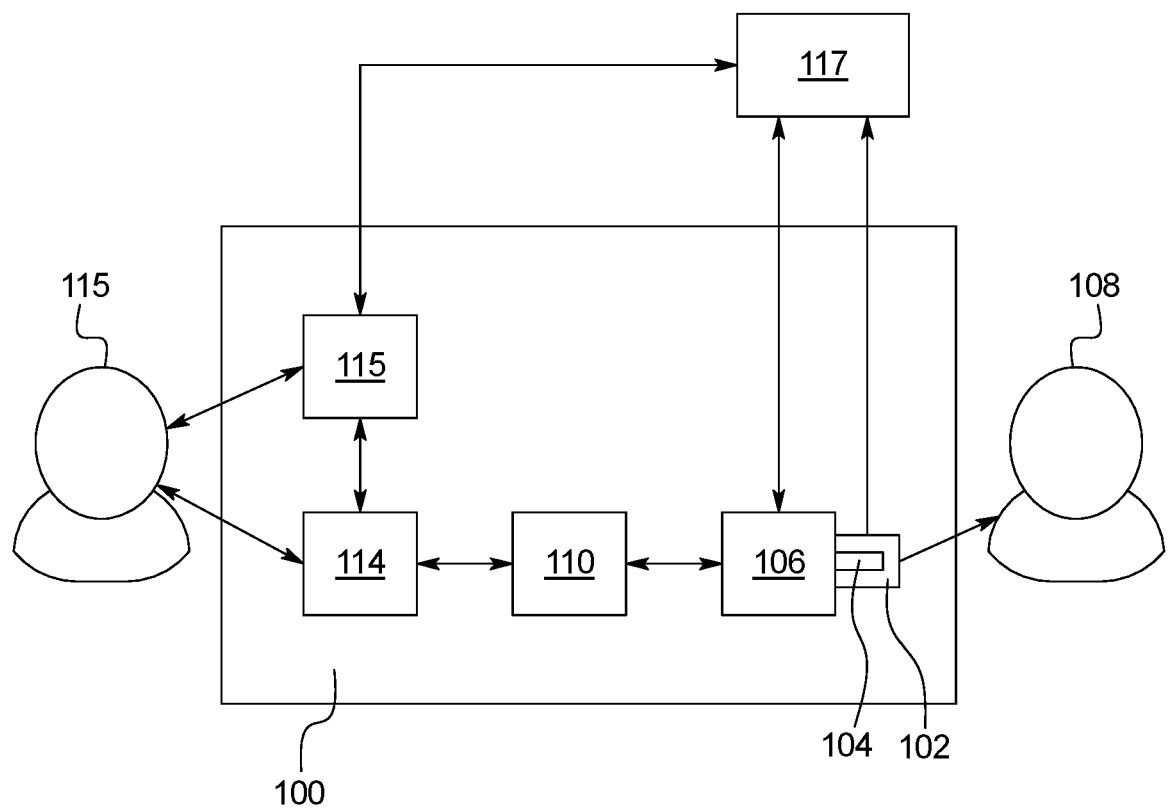
FIG. 1 is a schematic representation of a transrectal probe manipulator system of the present application.

FIG. 1 illustrates a transrectal probe manipulator system 100 for performing MR-guided transrectal prostate biopsy (MRgPBx) of the present application. The transrectal probe manipulator system 100 and corresponding method 300 is capable of being used in a variety of clinical settings, including both MRI-ultrasound fusion biopsy and a MR scanner room.

As seen in FIGS. 1-13, the transrectal probe manipulator system 100 includes a detachable probe 102 with a biopsy needle 104 mounted on a manipulator 106 having four degrees of freedom 124A-124D to allow for increased control and flexibility when positioning the probe 102 within a patient 108. The transrectal probe manipulator system 100 also includes an actuator assembly 110 to control a cable drive mechanism 112 for operating the manipulator 106 as well as an intervention planning workstation 114 for the medical professional 113 to alter the position of the probe 102 by adjusting the manipulator 106, visually estimate a trajectory of the biopsy needle 104, and operate the system 100. The transrectal probe manipulator system 100 may include or is in communication with a medical detection scanner workstation 115 that is in communication with an MR scanner 117.

Figure 2:
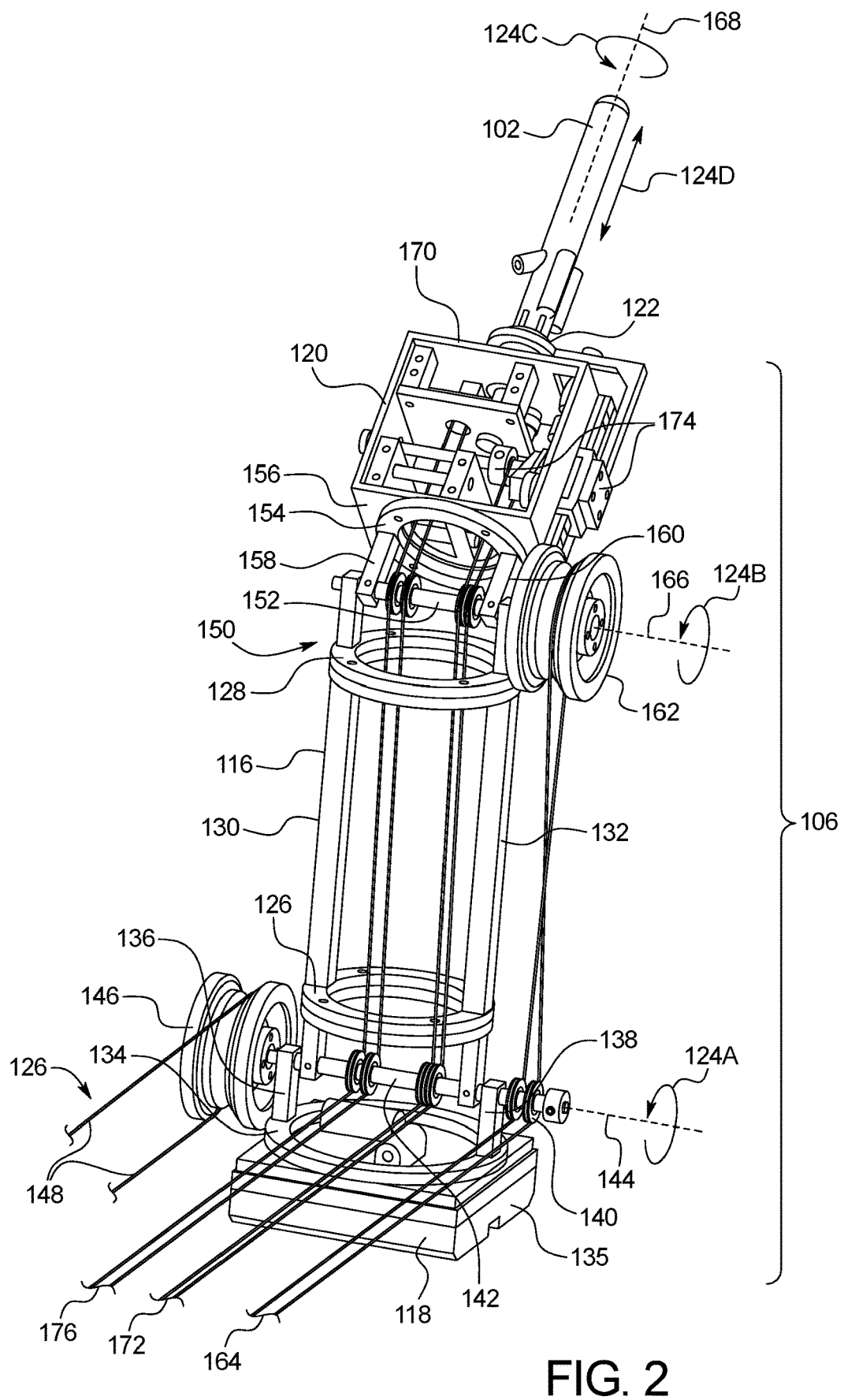
FIG. 2 is a perspective view of a transrectal probe manipulator system of the present application.
Figure 4:
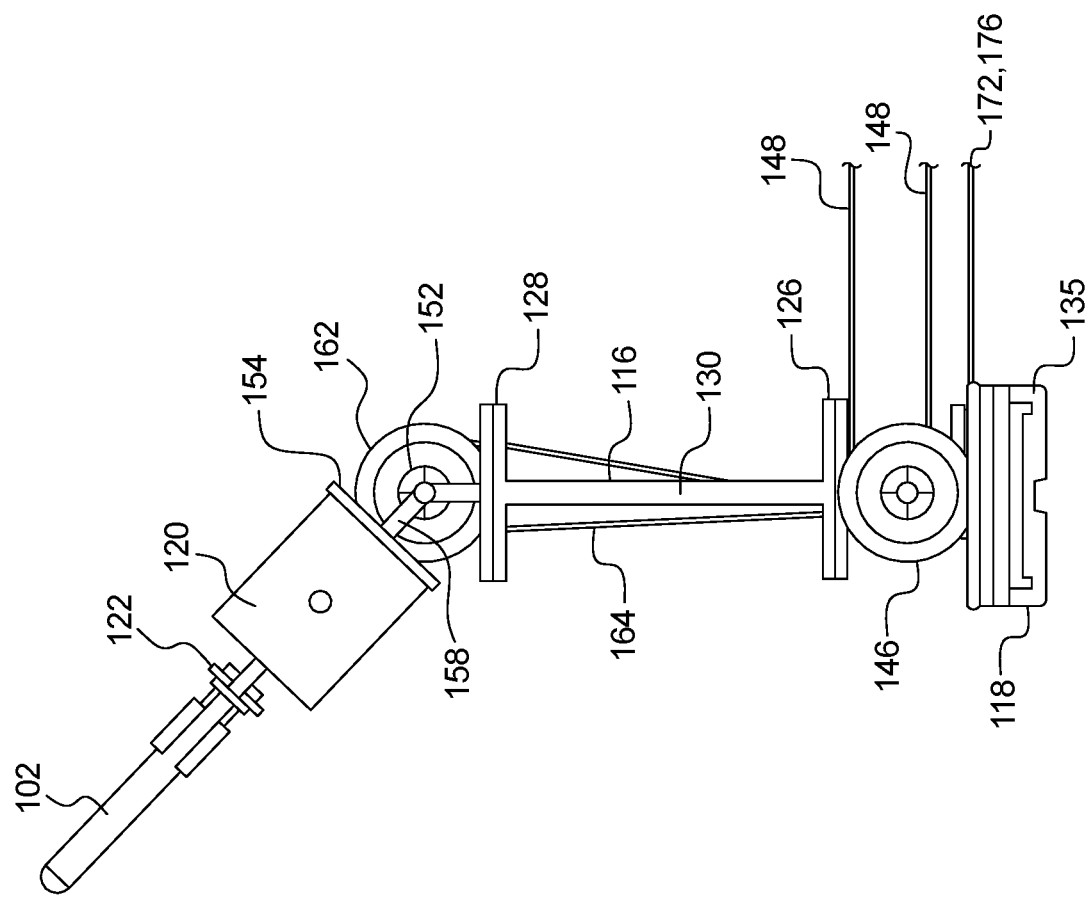
FIG. 4 is a right side elevational view of the transrectal probe manipulator system of FIG. 1.
Figure 3:
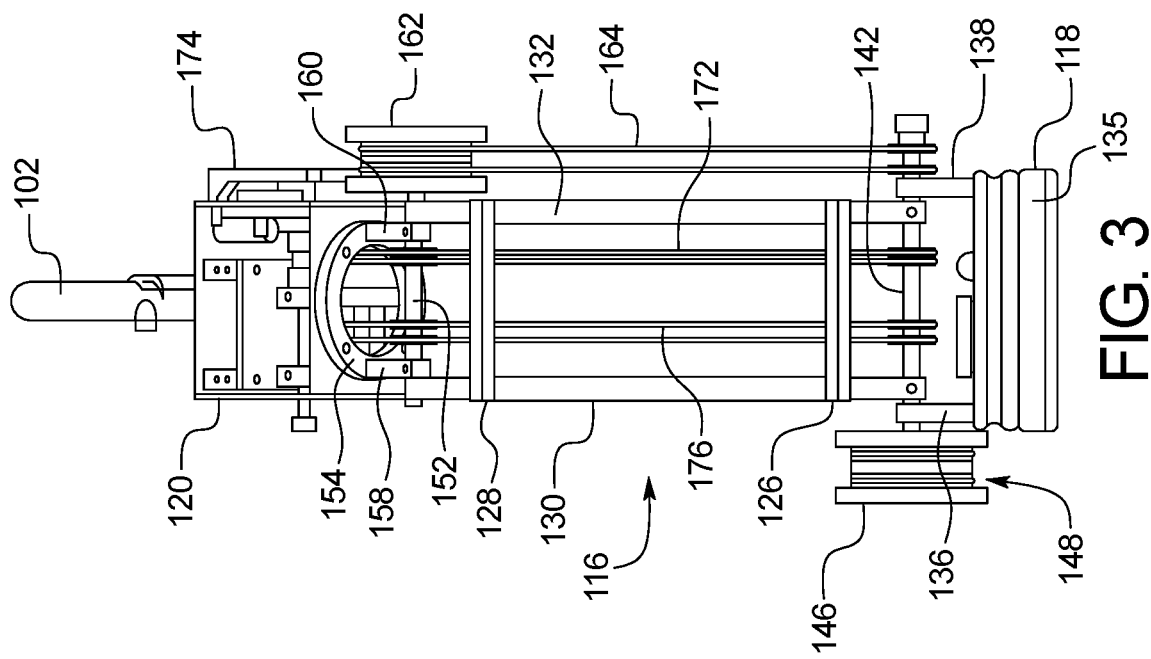
FIG. 3 is a front elevational view of the transrectal probe manipulator system of FIG. 1.

Referring to FIG. 2, the manipulator 106 includes a main frame 116 mounted on a base 118 and a mounting plate 120 connected to the main frame 116. The probe 102 is secured onto a probe receiver 122 on the mounting plate 120 opposite the main frame 116. The transrectal probe manipulator 106 allows for four degrees of freedom 124A-124D of movement actuated by a cable driven mechanism 126. In the example, the cables of each of the degrees of freedom 124A-124D are driven by the actuation assembly 110, either manually or in connection to motors within the actuation assembly 110.

Referring to FIGS. 2-6, the main frame 116 includes has a cylindrical shape formed by first and second annular discs 126, 128 spaced apart along a vertical axis through first and second support bars 130, 132. A base frame 134 is secured to a base body 135 and includes first and second shaft supports 136, 138 extending upwardly therefrom. A lower end 140 of the main frame 116 and the base 118 are connected along a first shaft 142 that allows for rotational movement of the main frame 116 about a first axis 144 of the first shaft 142. The first shaft 140 extends through bores within the lower ends 140 of the first and second support bars 130, 132 of the main frame 116 as well as bores within the first and second shaft supports 136, 138 of the base 118. In still further embodiments, the main frame 116 may include structures in addition to or in lieu of the components described above as desired or as necessitated by design.

A first pulley 146 is secured to the first shaft 140 outside of the main frame 116, and a first cable 148 engages the pulley 146 to turn the first shaft 140, thereby rotating the main frame 116 about the first axis 144 while the base 118 remains stationary. Rotation of the main frame 116 about the first axis 144 defines the first degree of freedom 124A.

The mounting plate 120 attaches to an upper end 150 of the main frame 116 along a second shaft 152 to define the second degree of freedom 124B. Mechanical devices for powering the transrectal probe 102 are secured atop the mounting plate 120. A mounting plate frame 154 is secured to a lower surface 156 of the mounting plate 120, with the mounting plate frame 154 including mounting plate first and second shaft supports 158, 160 extending downwardly therefrom. The second shaft 152 extends through bores within the upper ends 150 of the first and second support bars 130, 132 of the main frame 116 as well as bores within the first and second shaft supports 158, 160 of the mounting plate 120. In other embodiments, the mounting plate 120 may include structures in addition to the structures noted herein.

To rotate the mounting plate 120 about the shaft 152, a second pulley 162 is attached to an outer end of the second shaft 152. Movement of a second cable 164 about the second pulley 162 causes rotation of the mounting plate 120 about a second axis 166 of the shaft 152.

The third degree of freedom 124C is the annular rotation of the transrectal probe 102 about a longitudinal axis 168 of the probe 102. The transrectal probe 102 is mounted onto the probe receiver 122 on an upper surface 170 of the mounting plate 120 opposite the lower surface 156. The transrectal probe 102 rotates about the longitudinal axis 168 transverse to the upper surface 170 as shown in FIG. 1.

Figure 7:
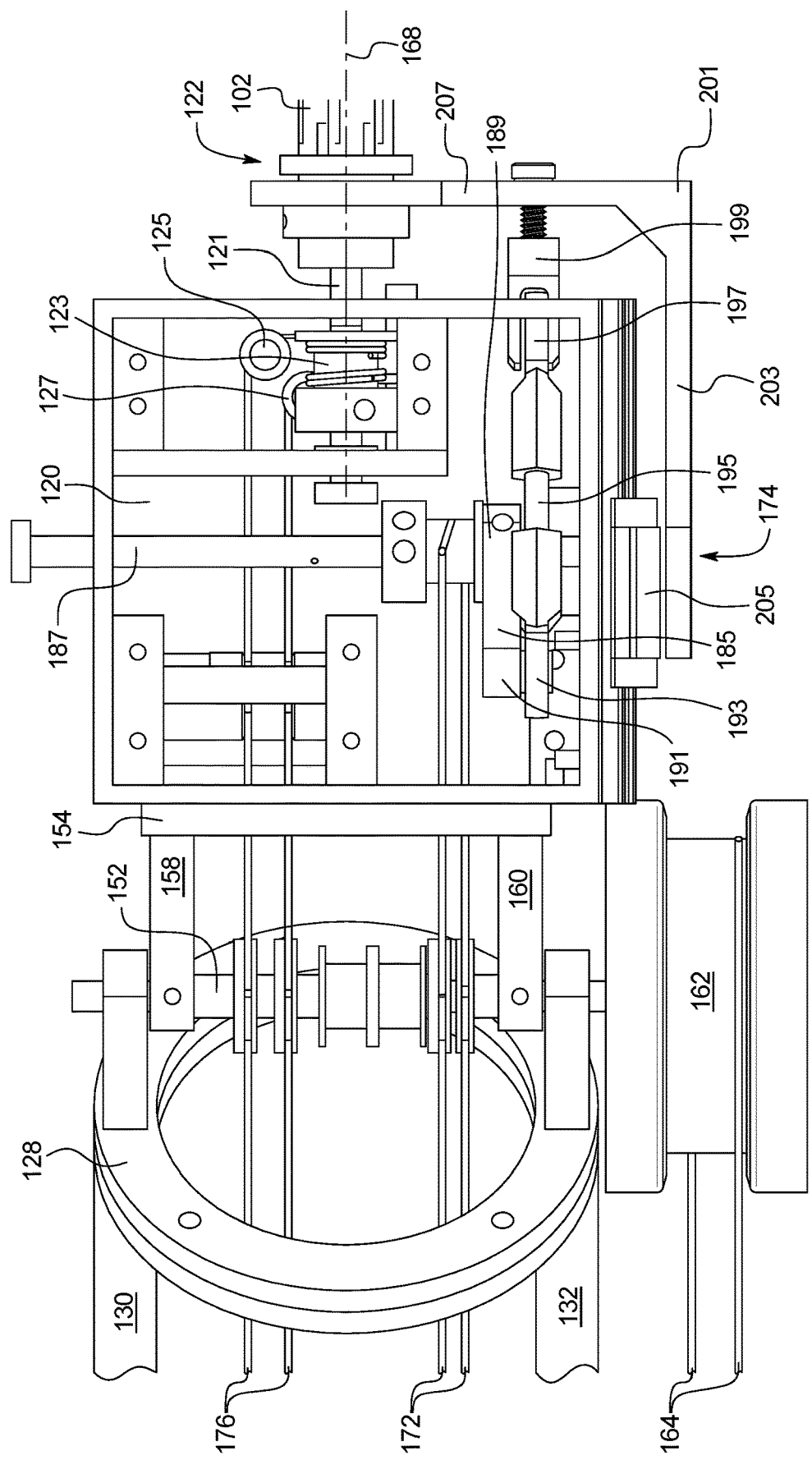
FIG. 7 is a plan view of a mounting plate of the transrectal probe manipulator system of FIG. 1

Referring to FIG. 7, a third cable 176 is used to control rotation of the probe 102 about the axis 168. More specifically, the probe receiver 122 is mounted on a faceted shaft 121 that is received by a correspondingly faceted bore within a spindle 123, with each of the probe 102, the shaft 121, and the spindle 123 being aligned with the longitudinal axis 168. The spindle 123 is secured to the upper surface 170 of the mounting plate 120 and is rotated by the third cable 176 through small pulleys immediately adjacent to the spindle 123. In one embodiment, each pulley includes an upright cylinder 125, 127 mounted to the upper surface 170 of the mounting plate 120. A length of the cable 176 extends from the second shaft 154, about the first cylinder 125, around the spindle 123, about the second cylinder 127, and back to the second shaft 154. Additional bearings may be used to facilitate movement of the cables about shafts throughout the system 100.

The fourth degree of freedom 124D is the movement of the transrectal probe 102 linearly along the longitudinal axis 168. A slider crank mechanism 174 is positioned on the mounting plate 120 and allows for conversion of rotational motion to linear motion. More specifically, adjustment of a fourth cable 172 connected to the slider crank mechanism 174 causes rotation of a crank 185 about a shaft 187 at a first end 189. A second end 191 of the crank 185 is secured to a first end 193 of a connecting rod 195 through a spherical joint. A second end 197 of the connecting rod 195 connects to a crankshaft 199 which moves linearly in response to the rotational movement of the crank 185. The slider crank mechanism 174 also includes an L-shaped arm 201 with a first arm portion 203 parallel to the crank 185 and the connecting rod 195 that is secured to the mounting plate 120 through a linear bearing 205. A second arm portion 207 extends perpendicularly to the first arm portion 201 and transverse to the longitudinal axis 168. The crankshaft 199 is secured to the second arm portion 207 of the arm 201 such that linear movement of the crankshaft 199 causes the second arm portion 207 to move linearly, either away from or toward the mounting plate 120. The second arm portion 207 is also attached to the probe receiver 122 such that the linear movement of the second arm portion 207 also causes linear movement of the probe receiver 122.

The combined motion of the first and second degrees of freedom 124A, 124B aligns the probe 102 inside the patient's rectum, and the third and fourth degrees of freedom 124C, 124D cause rotation and insertion/retraction of the probe 102 along the longitudinal axis 168 within the rectum. A medical professional operates the cables 148, 164, 172, 176 of the cable drive mechanism 126 to actuate each degree of freedom 124A-124D, as shown in FIG. 8.

Figure 8:
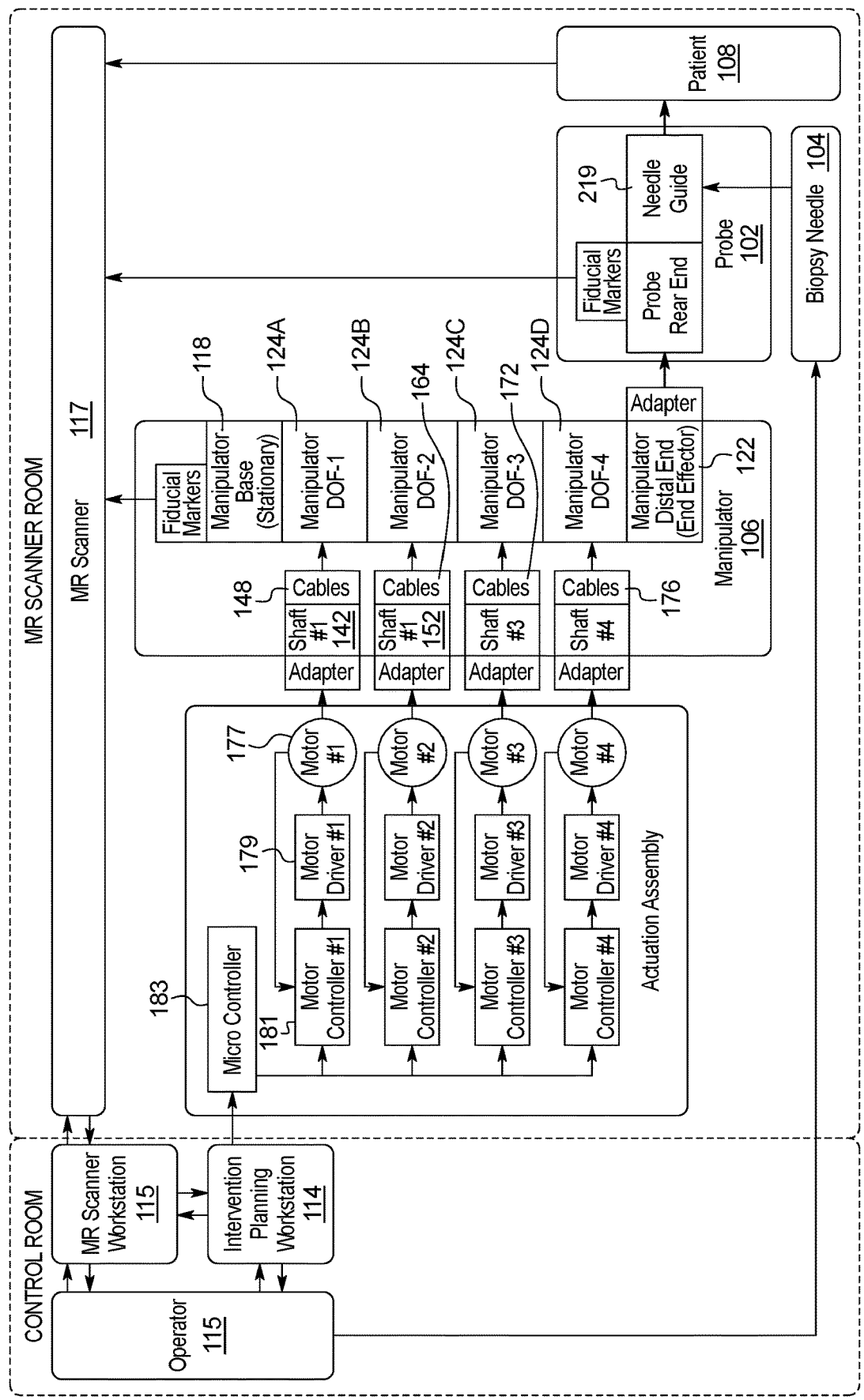
FIG. 8 is a schematic diagram of the hardware components of the transrectal probe manipulator system of FIG. 1.

The cables 148, 164, 172, 176 can be driven either manually or connected to motors 177 in the actuation assembly 110 as shown in FIG. 8. The actuation assembly 110 may include an assembly for manual actuation, a pneumatic driven assembly, a piezo-ceramic-motor, flexible shafts, DC servo motors, piezoelectric/ultrasonic motors, or stepper motors. The selection of the actuation assembly mechanisms may depend on the clinical setting, i.e., specific to the use of MRI-ultrasound fusion biopsy or a MR scanner room. The actuation assembly 110 may include a motor driver 179 for each motor 177, and a motor controller 181 in communication with each motor 177 and motor driver 179. The medical professional operates each motor through a controller 183, which communicates with each individual motor controller 181. In other embodiments, the actuation assembly 110 includes a plurality of shafts, each shaft rotatable to operate a cable. The shafts may be operated manually or through the use of a motor as described above, a pneumatic motor, or other device.

Figure 9:
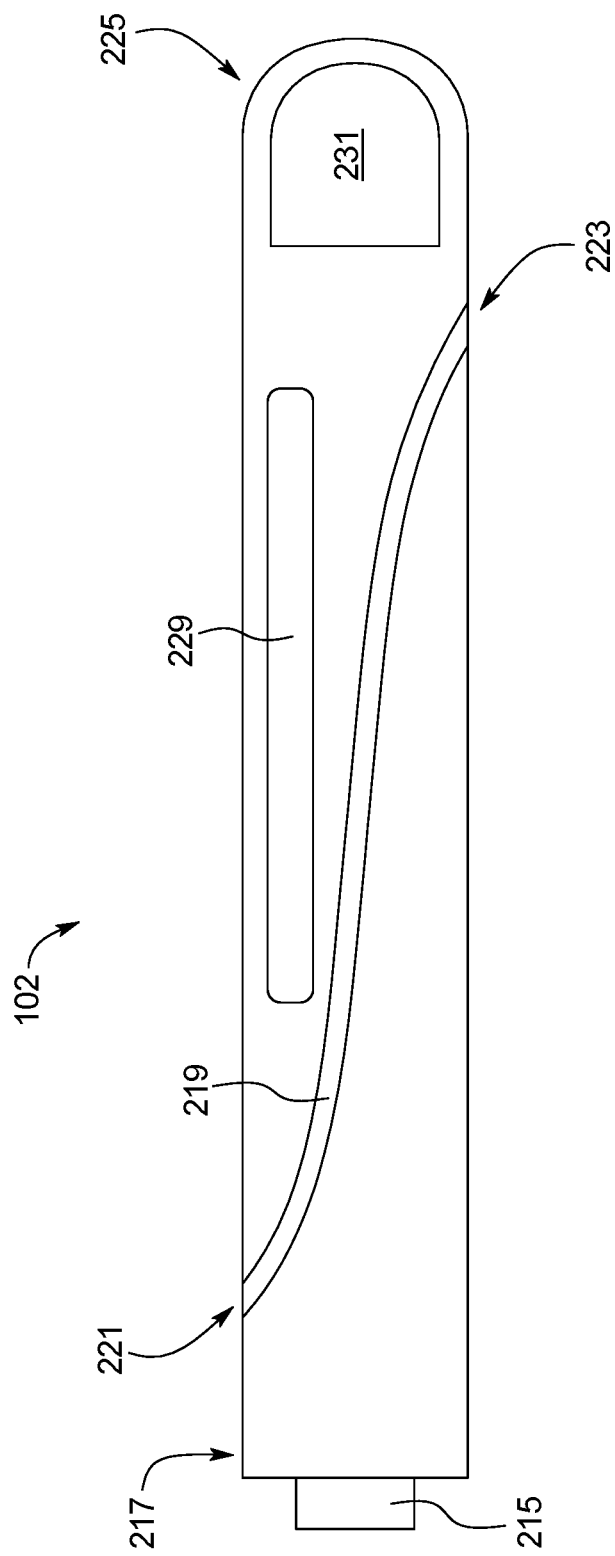
FIG. 9 is a side elevational view of a detachable probe of the transrectal probe manipulator system of FIG. 1.

An exemplary detachable probe 102 is provided in FIG. 9. An adapter 215 is provided at a proximal end 217 of the probe 102 for attaching to the probe receiver 122 (see FIG. 7). A needle guide or groove 219 is provided within the body of the probe 102 to pass the biopsy needle 104 through. An entry point 221 of the needle guide 219 is provided near the proximal end 217 of the probe, and an exit point 223 provided near a distal end 225 or a midpoint along the length of the probe 102. The probe 102 also includes a chamber 229 for holding MR fiducial markers or MR coils as well as a cavity 231 for holding an ultrasound transducer. The diameter and length of the probe may vary depending on the patient position and size. The probe 102 may also include a needle compartment or crevice for holding a biopsy needle 104.

Figure 10:
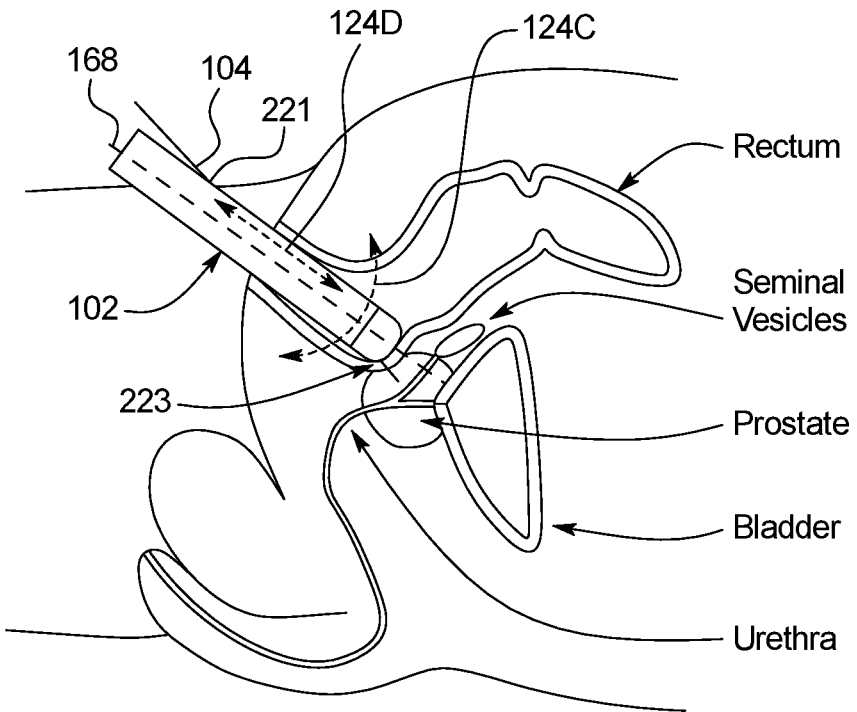
FIGS. 10 and 11 illustrate the probe of the transrectal probe manipulator system of FIG. 1 during use.
Figure 11:
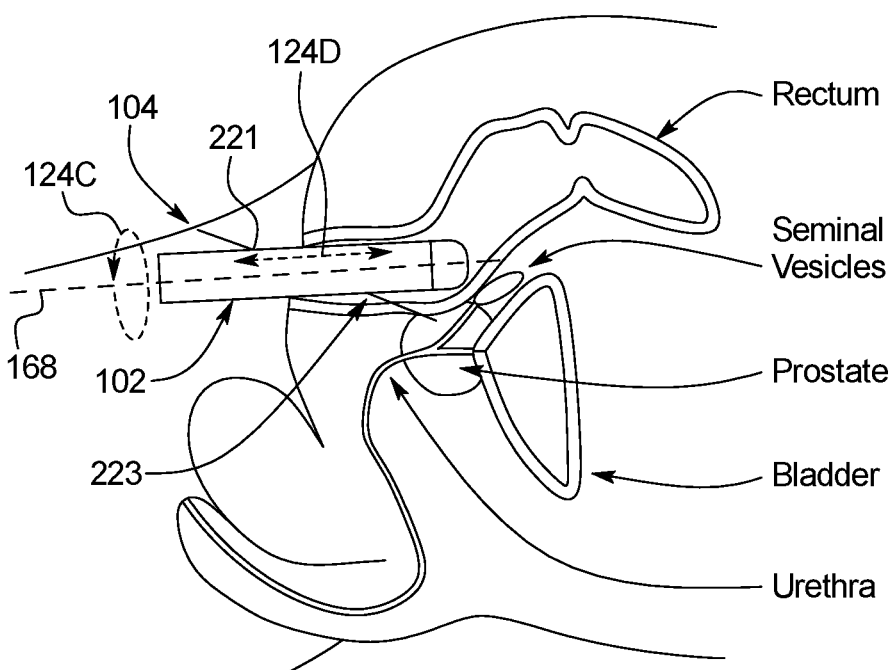

Referring to FIGS. 10 and 11, the positioning of the probe 102 in the rectum depends on the physical constraints of the patient's body as well as the exit point 223 of the biopsy needle 104 from the probe 102. The manipulator 116 may support different types of transrectal probes 102, including, for example, a probe 102 having an exit point 223 of the biopsy needle 104 on the inserted end 225 as shown in FIG. 10 or a probe 102 having an exit point 223 of the biopsy needle 104 located along the length of the probe 102 and spaced from the inserted end 225 as shown in FIG. 11. The type of probe 102 may be selected for the transrectal probe manipulator system 100 depending on various factors such as the patient's position (e.g., standard lithotomy, prone, or lateral) and the location of the malignant tissue relative to the prostate.

Referring to FIGS. 1 and 8, a medical professional 113 operates the manipulator 106 and probe 102 through an intervention planning workstation 114. The professional 113 also captures image slices around the region of intervention near the transrectal probe 102 utilizing a medical detection scanner workstation 115 to operate an MR scanner 117.

The intervention planning workstation 114 is configured to control the actuation of the manipulator 106, alter the position of the probe 102, and provide a visual estimation of a trajectory for the biopsy needle 102 comprising a superimposed image of the trajectory with the captured image slices. The intervention planning workstation 114 includes a processor and memory coupled thereto that is programmed with instructions for running intervention planning software 180 that actuates the manipulator 106 and fine tunes the position of the probe 102 inside the patient's rectum. The intervention planning software 180 uses an MR scanner coordinate system as a world coordinate system for registering the MR images, and virtual representation of the probe 102, and the manipulator 106 together. MR fiducial markers appear as high pixel intensity regions on MR images, and are used to align the position of the manipulator 106 and the probe 102 in the planning software 180.

Figure 12:
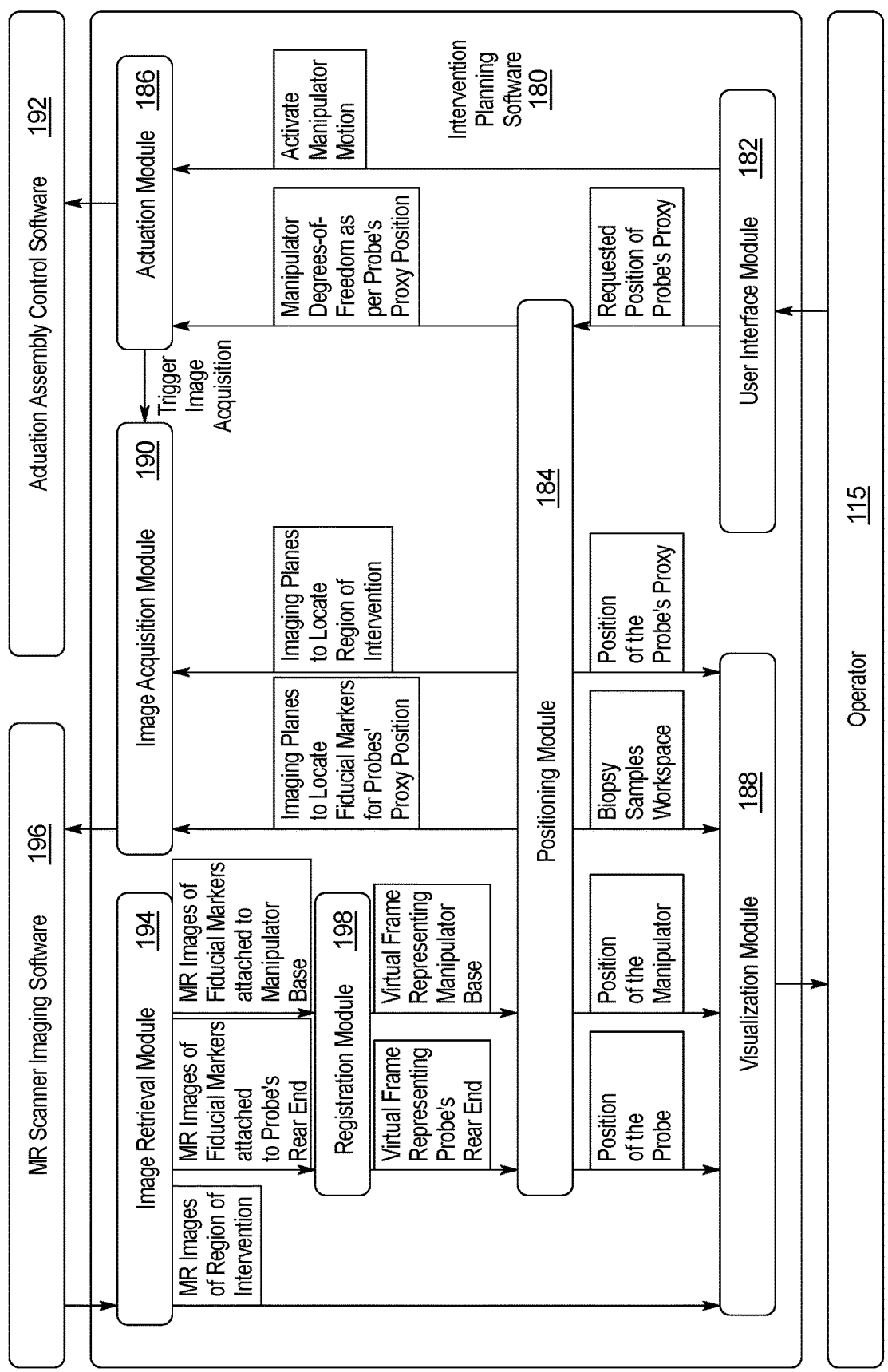
FIG. 12 is a schematic of the intervention planning workstation of the transrectal probe manipulator system of FIG. 1.

FIG. 12 illustrates the modules and communication between the modules of the intervention planning software 180. Each module provides and receives information to and from other modules, collectively working together to precisely position the probe within the patient's rectum, capture imaging data, and ensure that the biopsy needle reaches the targeted tissue.

At the user interface module 182, the medical professional 113 can sent the requested position of the probe's proxy to the positioning module 184 as well as activate motion on the manipulator 106 through the actuation module 186. The positioning module 184 provides information about the manipulator degrees of freedom 124A-124D as per the probe's proxy location to the actuation module 186 as well. The positioning module 184 also provides information about the pose of the probe 102, the pose of the manipulator 106, the biopsy samples workspace, and the pose of the probe's proxy to a visualization module 188.

While the actuation module 186 interacts with the actuation assembly control software 192, it also triggers image acquisition by the image acquisition module 190. Imaging planes to locate fiducial markers for the probe's proxy position and to locate the region of intervention are sent from the positioning module 184 to the image acquisition module 190. The image acquisition module 190 interacts with the MR scanner imaging software 196 to capture image slices.

The image retrieval module 194 receives the image slices from the MR scanner imaging software 196 and sends MR images of the region of intervention to the visualization module 188 for display. The image retrieval module 194 further communicates MR images of fiducial markers attached to the probe's rear end and to the manipulator base to a registration module 198. The registration module 198 provides virtual frames representing the probe's rear end and the manipulator base to the positioning module 188.

In one embodiment, the medical detection scanner 117 is a component of the transrectal probe manipulator system 100, while in other embodiments, the transrectal probe manipulator system 100 is in communication with a separate medical detection scanner 117. The medical detection scanner 117 may comprise an MR scanner or an MRI-ultrasound fusion scanner. Further, in one embodiment, the medical detection scanner workstation 115 is configured to control the medical detection scanner 117 through the MR scanner imaging software 196. For example, the medical detection scanner workstation 115 includes a processor located in a control room adjacent to the MR scanner room, while the medical detection scanner 117 is located in the MR scanner room. The processor includes memory coupled thereto that is programmed with instructions to run the MR scanner imaging software 196.

The intervention planning workstation 114 may include a personal computer different than the computer of the medical detection scanner workstation 115. In other examples, the same personal computer may be used as both workstations 115, 117.

Figure 13:
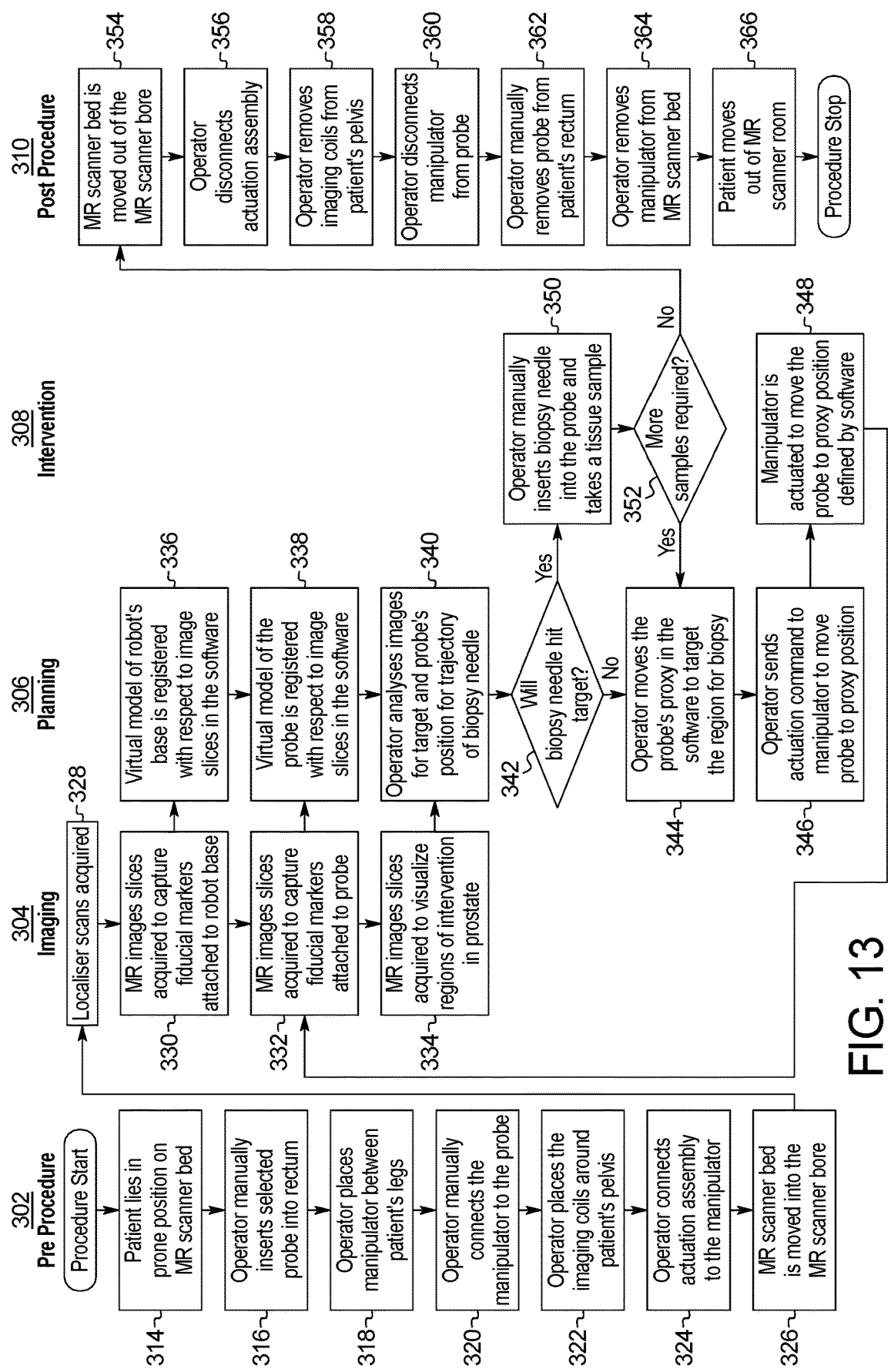
FIG. 13 is a flow chart illustrating how the transrectal probe manipulator system of FIG. 1 is used.

FIG. 13 is a flow chart illustrating the method 300 for operating the transrectal manipulator probe system 100. The method 300 includes steps associated with a pre-procedure phase 302, an imaging phase 304, a planning phase 306, an intervention phase 308, and a post procedure phase 310.

In the pre-procedure phase 302, the patient first lies in the prone position on an MR scanner bed in step 314. The operator or medical professional 113 inserts a probe into the rectum and places a manipulator between the patient's legs in steps 316 and 318. The operator manually connects the manipulator to the probe in step 320 and places the imaging coils around the patient's pelvis in step 322. The operator then connects the actuation assembly to the manipulator in step 324. The MR scanner bed is then moved into the MR scanner room in step 326.

The imaging phase 304 is then ready to begin. In step 328, localizer scans are acquired. MR image slices are then acquired to capture fiducial markers attached to the base of the manipulator and the probe in steps 330 and 332, respectively. Image slices are then acquired to visualize regions of the intervention in the prostate in step 334.

Simultaneous with the imaging steps 304, the planning phase 306 begins. The operator adjusts the probe's proxy to assess its reachability for targeted biopsies. By inspecting the biopsy needle trajectories superimposed with rendered structures and MR images, the operator is able to assess the collision of the need intervention path with structures, such as the urethra, and adjust the trajectory accordingly. Once the proxy is positioned, the operator sends the command to actuate the manipulator. The manipulator moves the probe to its proxy position, and then the operator manually inserts the biopsy needle in the needle compartment of the probe to take a tissue sample.

More specifically, the planning phase 306 begins by registering a virtual model of the base and the probe with respect to image slices in the software in steps 336 and 338, respectively. Each of steps 336 and 338 are prompted by the generation of image slices in steps 330 and 332. Registration of the virtual models of the base and probe lead to the operator analyzing the images of the target and the probe's position for trajectory of the biopsy needle in step 340. In the next step 342, the operator determines whether the biopsy needle will strike the target. If no, the operator moves the probe's proxy in the software to target the region for the biopsy in step 344. The operator then sends an actuation command to the manipulator to move the probe to a proxy position in step 346, and the manipulator is actuated to move the probe to the proxy position defined by the software in step 348.

If the biopsy needle will strike the target at step 342, the operator manually inserts the needle into the probe and takes a tissue sample in step 350, leading to the intervention phase 308 of the method 300. The operator then determines if more samples are required in step 352. If yes, the operator moves the probe's proxy according to step 344. If no, the operator moves onto the post procedure steps 310.

During the post-procedure phase 310, the MR scanner bed is first moved out of the MR scanner room in step 354. The operator disconnects the actuation assembly and removes the imaging coils from the patient's pelvis in steps 356 and 358. The operator then disconnects the manipulator from the probe and removes the probe from the patient's rectum in steps 360 and 362. The operator removes the manipulator from the MR scanner room, and the patient moves out of the MR scanner room in steps 364 and 366. The procedure is then stopped.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

We claim:

1. A transrectal probe manipulator system comprising:
   a probe including a biopsy needle; and
   a manipulator comprising:
   a base including first and second base support shafts on a base body;
   a main frame, wherein a lower end of the main frame is rotatably connected to the base through a first shaft that extends through the lower end of the main frame and the first and second base support shafts to define a first degree of freedom; and
   a mounting plate including first and second mounting plate support shafts on a lower surface and a probe receiver on an upper surface, wherein the mounting plate is rotatably connected to the main frame through a second shaft that extends through an upper end of the main frame and the first and second mounting plate support shafts to define a second degree of freedom, wherein the probe receiver is rotatable about and linearly moveable along a central axis to define a third degree of freedom and a fourth degree of freedom, respectively;
   wherein the probe is secured to the probe receiver and wherein the main frame comprises a first annular disc and a second annular disc.

2. The transrectal probe manipulator system of claim 1, wherein the main frame includes first and second support bars, wherein the first shaft extends through the first and second support bars and the first and second base support shafts, and wherein the second shaft extends through the first and second support bars and the first and second mounting plate support shafts.

3. The transrectal probe manipulator system of claim 1, further comprising a first cable that is operatively connected to the first shaft for actuating the first degree of freedom, and a second cable that is operatively connected to the second shaft for actuating the second degree of freedom.

4. The transrectal probe manipulator system of claim 3, further comprising a third cable and a fourth cable, wherein the third cable and the fourth cable are operatively connected to the probe receiver for actuating the third degree of freedom and the fourth degree of freedom, respectively.

5. The transrectal probe manipulator of claim 4, further comprising an actuation assembly for operating the first cable, the second cable, the third cable, and the fourth cable.

6. The transrectal probe manipulator of claim 1, further comprising an intervention planning workstation comprising:
   a processor; and
   a memory coupled to the processor, wherein the memory is configured to store program instructions executable by the processor;
   wherein in response to executing the program instructions, the processor is configured to:
      receive, by an image retrieval module, one or more images of the probe and the base of the manipulator from a magnetic resonance (MR) scanner;
      receive, by a registration module, one or more images of fiducial markers attached to the probe and the base of the manipulator from the image retrieval module;
      register, by the registration module, a virtual model of the base and a virtual model of the probe with respect to the images; and
      present, by a visualization module, a visualization of the virtual model, wherein the visualization includes a probe position, a trajectory of the biopsy needle, and a target area.

7. A transrectal probe manipulator system comprising:
   a manipulator comprising:
      a base including first and second base support shafts;
      a main frame including first and second support bars;
      a mounting plate including first and second mounting plate support shafts and a movable probe receiver;
      a first shaft having a first axis extending through the first and second base support shafts of the base and the first and second support bars of the main frame; and
      a second shaft having a second axis extending through the first and second mounting plate support shafts of the mounting plate and the first and second support bars of the main frame;
   a probe including a longitudinal axis and a biopsy needle, wherein the probe is mounted onto the probe receiver; and
      wherein the rotation of the main frame about the first axis provides a first degree of freedom;
      wherein the rotation of the mounting plate about the second axis provides a second degree of freedom;
      wherein rotation of the probe about and linearly movement along the longitudinal axis of the probe provides a third degree of freedom and a fourth degree of freedom, respectively; and
      wherein the main frame comprises a first annular disc and a second annular disc.

8. A transrectal probe manipulator system of claim 7, further comprising a first pulley on the first shaft, a first cable operatively connected to the first pulley, a second pulley on the second shaft, and a second cable operatively connected to the second pulley, wherein movement of the first cable and the second cable actuate the first degree of freedom and the second degree of freedom, respectively.

9. The transrectal probe manipulator system of claim 7, further comprising:
   a cable drive mechanism for operating the first degree of freedom, the second degree of freedom, the third degree of freedom, and the fourth degree of freedom;
   an actuation assembly for operating the cable drive mechanism;
   an intervention planning workstation comprising:
      a processor; and
      a memory coupled to the processor, wherein the memory is configured to store program instructions executable by the processor,
      wherein in response to executing the program instructions, the processor is configured to:
         receive user input to activate the actuation assembly;
         receive images from a magnetic resonance (MR) scanner; and
         present a visualization of the virtual model, wherein the visualization includes a probe position, a trajectory of the biopsy needle, and a target area.

10. The transrectal probe manipulator system of claim 9, wherein the actuation assembly comprises a plurality of motors and corresponding motor controllers for operating the cable drive mechanism.

11. The transrectal probe manipulator system of claim 9, wherein the actuation assembly comprises a plurality of shafts configured to be rotated manually, wherein the first cable, the second cable, the third cable, and the fourth cable are connected to the plurality of shafts.

12. The transrectal probe manipulator system of claim 9, wherein the actuation assembly comprises a plurality of shafts and a plurality of pneumatic motors for operating the plurality of shafts, wherein the first cable, the second cable, the third cable, and the fourth cable are connected to the plurality of shafts.

13. The transrectal probe manipulator system of claim 10, wherein the processor is in communication with the plurality of motor controllers.

14. The transrectal probe manipulator system of claim 11, wherein the fourth cable is configured to actuate a slider crank mechanism.

15. The transrectal probe manipulator system of claim 14, wherein the third cable is configured to actuate rotation of a spindle.

16. The transrectal probe manipulator system of claim 15, wherein the transrectal probe manipulator system is configured to actuate rotation and translation movements of a detachable probe.

* * * * *